United States Patent
Cathier et al.

(10) Patent No.: US 7,333,646 B2
(45) Date of Patent: Feb. 19, 2008

(54) WATERSHED SEGMENTATION TO IMPROVE DETECTION OF SPHERICAL AND ELLIPSOIDAL OBJECTS USING CUTTING PLANES

(75) Inventors: Pascal Cathier, Bures (FR); Luca Bogoni, Philadelphia, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 526 days.

(21) Appl. No.: 11/065,727

(22) Filed: Feb. 25, 2005

(65) Prior Publication Data

US 2005/0265601 A1    Dec. 1, 2005

Related U.S. Application Data

(60) Provisional application No. 60/576,041, filed on Jun. 1, 2004.

(51) Int. Cl.
*G06K 9/00* (2006.01)

(52) U.S. Cl. ............................ 382/128; 128/922; 378/4

(58) Field of Classification Search ............... 382/100, 382/128, 130, 131, 132, 133; 128/922; 378/4
See application file for complete search history.

(56) References Cited

U.S. PATENT DOCUMENTS

| | | | | |
|---|---|---|---|---|
| 3,746,872 A | * | 7/1973 | Ashe et al. .................... | 378/2 |
| 4,630,203 A | * | 12/1986 | Szirtes ........................ | 382/132 |
| 5,276,613 A | * | 1/1994 | Schlumberger ................ | 378/4 |
| 6,295,464 B1 | * | 9/2001 | Metaxas ....................... | 600/407 |
| 6,359,960 B1 | * | 3/2002 | Wahl et al. .................... | 378/20 |
| 6,609,021 B1 | | 8/2003 | Fan et al. | |
| 6,778,690 B1 | * | 8/2004 | Ladak et al. ................. | 382/131 |
| 2004/0096090 A1 | * | 5/2004 | Bascle et al. ................ | 382/132 |

OTHER PUBLICATIONS

Luc Vincent, et al., Watersheds in Digital Spaces: An Efficient Algorithm Based on Immersion Simulations, IEEE Transaction of Pattern Analysis and Machine Intelligence, vol. 13, No. 6. Jun. 1991.
Gonzalez R et al, "Digital Image Processing: Section 10.5 Segmentation by Morphological Watersheds", Prentice Hall, Nov. 9, 2001, pp. 617-626.
International Search Report including Notification of Transmittal of the International Search Report, International Search Report, and Written Opinion of the International Searching Authority.

\* cited by examiner

*Primary Examiner*—Bhavesh M Mehta
*Assistant Examiner*—Anand Bhatnagar

(57) ABSTRACT

In one exemplary embodiment of the present invention, a method of detecting a desired object at a candidate pixel from an image is provided. The method includes the steps of (a) selecting a representative point in the desired object; (b) determining first representative cross-sections of the desired object by passing first lower dimension planes through the representative point; (c) passing at least one second lower dimension plane through the candidate pixel; (d) using region segmentation to separate the candidate pixel containing second regions from the rest of the pixels in each of the at least one second lower dimension plane; (e) matching at least one of the second regions with at least one of the first cross-sections; (f) determining a match value based on the result of step (e); and (g) using the match value to determine if the desired object is detected at the candidate pixel.

20 Claims, 3 Drawing Sheets

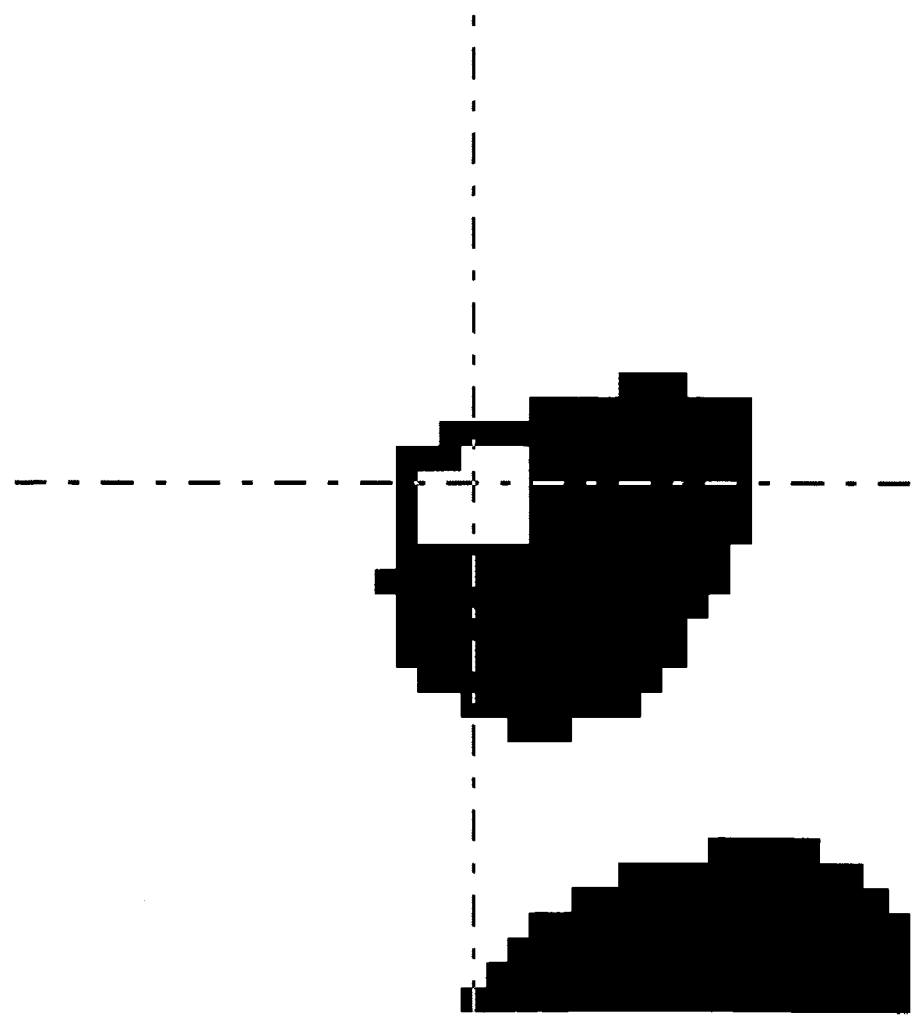

WATERSHED SEGMENTATION TO IMPROVE DETECTION OF SPHERICAL AND ELLIPSOIDAL OBJECTS USING CUTTING PLANES

CROSS-REFERENCE TO RELATED APPLICATIONS

This application claims priority to U.S. Provisional Application No. 60/576,041, which was filed on Jun. 1, 2004, and which is fully incorporated herein by reference.

BACKGROUND OF THE INVENTION

1. Field of the Invention

The present invention relates generally to the field of computer-based imaging, and, more particularly, to detecting spherical and ellipsoidal objects from an image.

2. Description of the Related Art

A number of image-based computer-aided diagnostic ("CAD") tools aim to help physicians detect spherical and ellipsoidal structures in a large set of image slices. In a chest image, for example, a physician may be interested in detecting nodules, which appear as white spheres or half-spheres inside the dark lung region. In a colon image, for another example, a physician may be interested in detecting polyps, which appear as spherical and hemi-spherical protruding structures attached to the colon. In a vessel image, for another example, a physician may be interested in detecting aneurysms, which appear as spherical protruding structures out of the vessel surface. Physicians may desire to detect any of a variety of other structures present in the anatomy. These structures may include, but are not limited to, various types of cysts, polyps in the bladder, hemangiomas in the liver, and the like.

Current approaches for detecting spherical or partially spherical structures from a 3D image generally divide the image into a number of 2D planes. Circular structures or bumps are then detected in the number of planes, which are oriented in a number of directions that span the entire image. Information collected from the number of planes can be combined into a 3D rendering.

Further, the original volumetric data may be pre-processed, e.g., to enhance the overall outcome of the process, or to find spherical objects in another representation of the same image after some transform. However, such pre-processing may take time and make assumptions that are not robust or consistently valid, resulting in performance failures.

SUMMARY OF THE INVENTION

In one aspect of the present invention, a method of detecting a desired object at a candidate pixel from an image is provided. The method includes the steps of (a) selecting a representative point in the desired object; (b) determining first representative cross-sections of the desired object by passing first lower dimension planes through the representative point; (c) passing at least one second lower dimension plane through the candidate pixel; (d) using region segmentation to separate the candidate pixel containing second regions from the rest of the pixels in each of the at least one second lower dimension plane; (e) matching at least one of the second regions with at least one of the first cross-sections; (f) determining a match value based on the result of step (e); and (g) using the match value to determine if the desired object is detected at the candidate pixel.

In another aspect of the present invention, a machine-readable medium having instructions stored thereon for execution by a processor to perform a method of detecting a desired object at a candidate pixel from an image is provided. The method includes the steps of (a) selecting a representative point in the desired object; (b) determining first representative cross-sections of the desired object by passing first lower dimension planes through the representative point; (c) passing at least one second lower dimension plane through the candidate pixel; (d) using region segmentation to separate the candidate pixel containing second regions from the rest of the pixels in each of the at least one second lower dimension plane; (e) matching at least one of the second regions with at least one of the first cross-sections; (f) determining a match value based on the result of step (e); and (g) using the match value to determine if the desired object is detected at the candidate pixel.

In yet another aspect of the present invention, a system of detecting a desired object at a candidate pixel from an image is provided. The system includes a selection means for selecting a representative point in the desired object; a determination means for determining first representative cross-sections of the desired object by passing first lower dimension planes through the representative point; a segmentation means for using region segmentation to separate the candidate pixel containing second regions from the rest of the pixels in each of the at least one second lower dimension plane; a match means for (a) matching at least one of the second regions with at least one of the first cross-sections, and (b) determining a match value based on the matching; and a detection means for using the match value to determine if the desired object is detected at the candidate pixel.

BRIEF DESCRIPTION OF THE DRAWINGS

The invention may be understood by reference to the following description taken in conjunction with the accompanying drawings, in which like reference numerals identify like elements, and in which:

FIG. 3 depicts an image after segmenting the image of FIG. 2 using a simple threshold and information from the watershed segmentation.

DETAILED DESCRIPTION OF PREFERRED EMBODIMENTS

Figure 1:
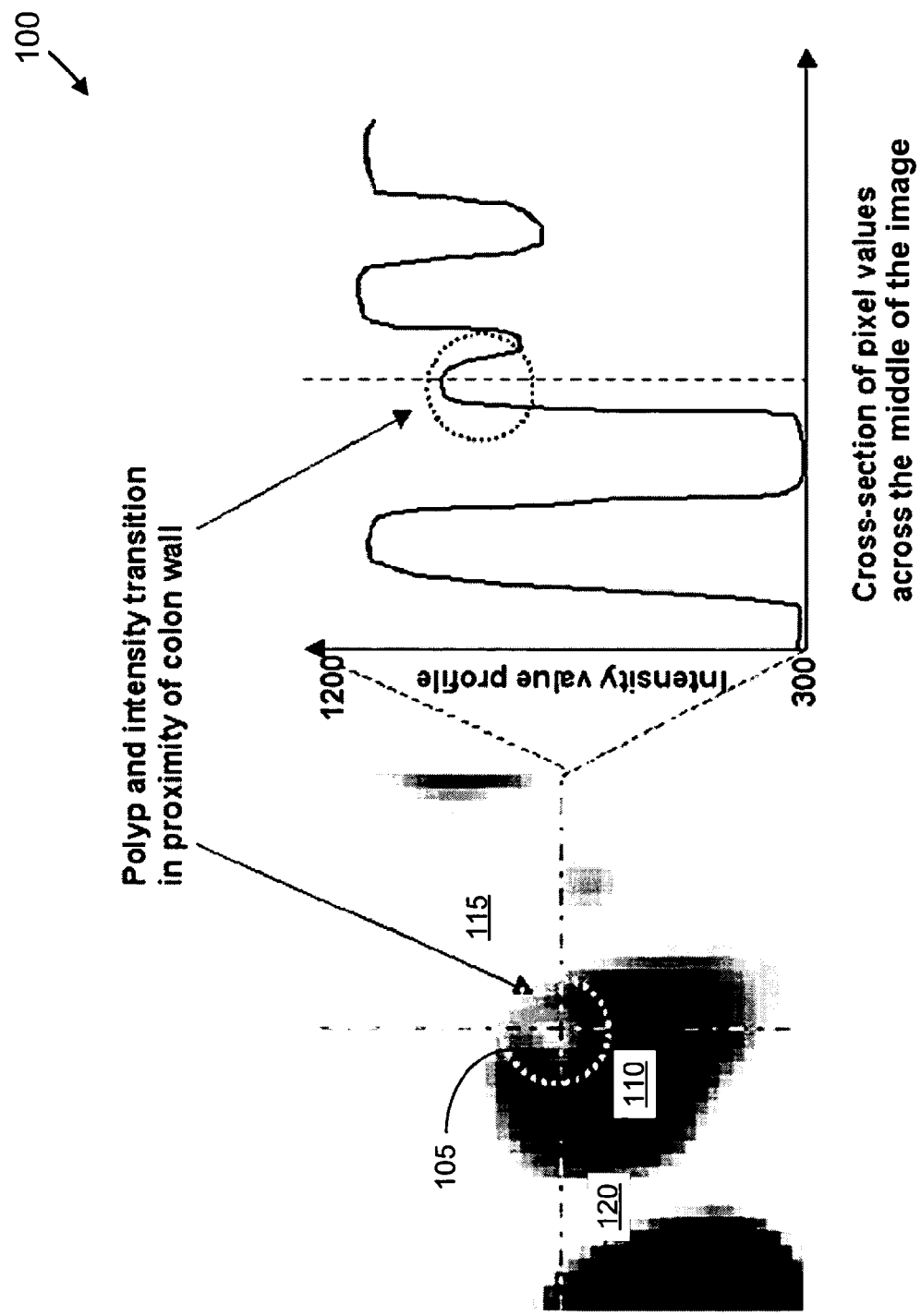
FIG. 1 depicts a slice from a three-dimensional CT image of the colon including a polyp, in accordance with one exemplary embodiment of the present invention.

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

In the following disclosure, it should be appreciated that the term "image," as used herein, may include an image of any dimension greater than or equal to 2 (e.g., a two-dimensional image, a three-dimensional volume).

Although not so limited, for the sake of simplicity, exemplary embodiments of the present invention will be described herein with respect to partially spherical objects in the context of colon polyps in computer tomography ("CT") images. However, it should be appreciated that the present invention may be applicable for a wide range of modalities, including magnetic resonance ("MR"), ultrasound ("US") and positron emission tomography ("PET"), as contemplated by those skilled in the art. It should also be appreciated that the present invention may be applicable for non-medical imaging applications, such as finding a spherical salt dome in seismic data.

In the ideal case, a circular object (i.e., region of interest) is clearly separated from the background and from other objects (hereinafter referred to collectively as "background"). A simple intensity threshold would be sufficient to isolate the region of interest. However, as is typically the case, the circular object may not be easily separated from the background by a simple threshold or a threshold that can be uniquely applied across an image.

For example, consider an image including two objects: a circular object (i.e., the region of interest) and a background object. Also consider that the intensity of the area between the two objects, which is likely the intensity of the background, is similar to the intensity of the two objects because of partial volume effect and/or smoothing due to image acquisition and/or reconstruction. In this case, an optimal thresholding technique should be able to adapt to find the contour of an object, no matter the intensity of the background and the variation thereof. For example, when two objects are close to each other, the partial volume effect between them makes the intensity of the background much closer to the intensity of the objects than elsewhere. FIG. 1, illustrates the above example on a computer tomography ("CT") image of a colon.

Referring now to FIG. 1, a slice from a three-dimensional CT image 100 of the colon is illustrated, presenting a polyp 105 encompassed by a dotted circle. The polyp 105 is present within a lumen 110 (also known as the "background" or "air") and surrounding bodily tissue 115. The edge between the surrounding bodily tissue 115 and the lumen 110 is a colon wall. It should be noted that the intensity between the polyp 105 and the colon wall may differ from the intensity of the background, and is generally not predictable.

Polyps 105 are attached to the colon wall and in the place of attachment, due both to the attachment transition, which creates a ridge, and to the slicing through the volume, there are partial volume effects. These volume effects appear as decreasing of intensity values, as illustrated in FIG. 1. Referring again to FIG. 1, visualization of the intensity value profile across the center horizontal image on the left. The dotted circle area shows the polyp 105. As we follow the horizontal line 120 in the image, we can see that the intensity profile starts from low, then increases. In the center (crosshair section with the polyp 105), we can see that the intensity values increase on the left of the polyp 105 and across the polyp, but decrease again to reveal the ridge. This ridge may be hard to define. The watershed approach described herein enables the detection of the transition easily.

As used herein, the term "intensity" refers to a measure of local X-Ray absorption coefficient of a CT image. For visualization purposes, one may use a mapping from intensities to colors. For example, in one exemplary mapping technique, low absorption coefficients such as the absorption coefficient of air correspond to the color "black", and high absorption coefficients such as the absorption coefficient of tissues correspond to light gray or white.

We propose a technique using watershed segmentation (i.e., watershed method) for automatically separating the regions of interest, thereby overcoming the problems of choosing an optimal threshold. The watershed method is a technique for segmenting basins of the intensity profiles by simulating a flooding. The term "watershed" refers to an area of an image that drains down a slope to the lowest point. The output of the watershed method is a set of labeled, connected components as well as a set of crest points between the connected components.

Watershed segmentation is a morphological technique, which can be intuitively described as follow:

(1) View an image as a height map, and gradually immerse it in water, with the water leaking through the minimum points and rising uniformly and globally across the image; and (2) Place a "dam" where two distinct bodies of water (i.e., catchment basins) meet and continue the process until water has reached all the points of the image. The dams provide the final segmentation. The dams can be interpreted in the image domain as the growth of seeds placed on the minima of the image at a time proportional to their height that finally converges on the crest lines of the intensity map. The term "minima" refers to a point, curve or flat surface that is not surrounded by pixels with a lower value. The term "maxima" refers to a point, curve or flat surface that is not surrounded by pixels with a higher value.

Isolating an object (i.e., the region of interest) from the background generally requires determining the borders (i.e., where the object begins and ends) of the object. However, deciding the borders for an object in a background may be uncertain for pixels (i.e., ridge points) of the borders having an intensity value between the object intensity range and the background intensity range. These intensity values may be artificially created by partial volume effect or blurring.

Watershed segmentation can separate the object from the background. In particular, watershed segmentation produces ridge points that encircle the object of interest. Watershed segmentation will typically find all ridge points in an image. However, only the ridge points with an uncertain intensity range between the object intensity range and the background intensity range are needed. To constrain the watershed to find the ridge points only within this uncertain intensity range, we remove all local maxima in the object and background, e.g., by appropriately thresholding the image. This may be known as object and background local maxima suppression.

Post-processing of the watershed method may be necessary. In particular, one may want to suppress all ridge points between connected components whose maximum intensities are not in the range of the object intensity (i.e., the ridge points are pure partial volume clusters), if one knows that such a situation implies that these connected components belong to the same object. As used herein, the term "connected component" refers to an amassment of pixels that is "fully connected." That is, for any two pixels of this set, one can go from one pixel to the other, hopping from neighbor to neighbor. In an alternate embodiment, one could also merge all neighboring connected components whose maximum intensities are inside the range of object intensity.

Figure 2:
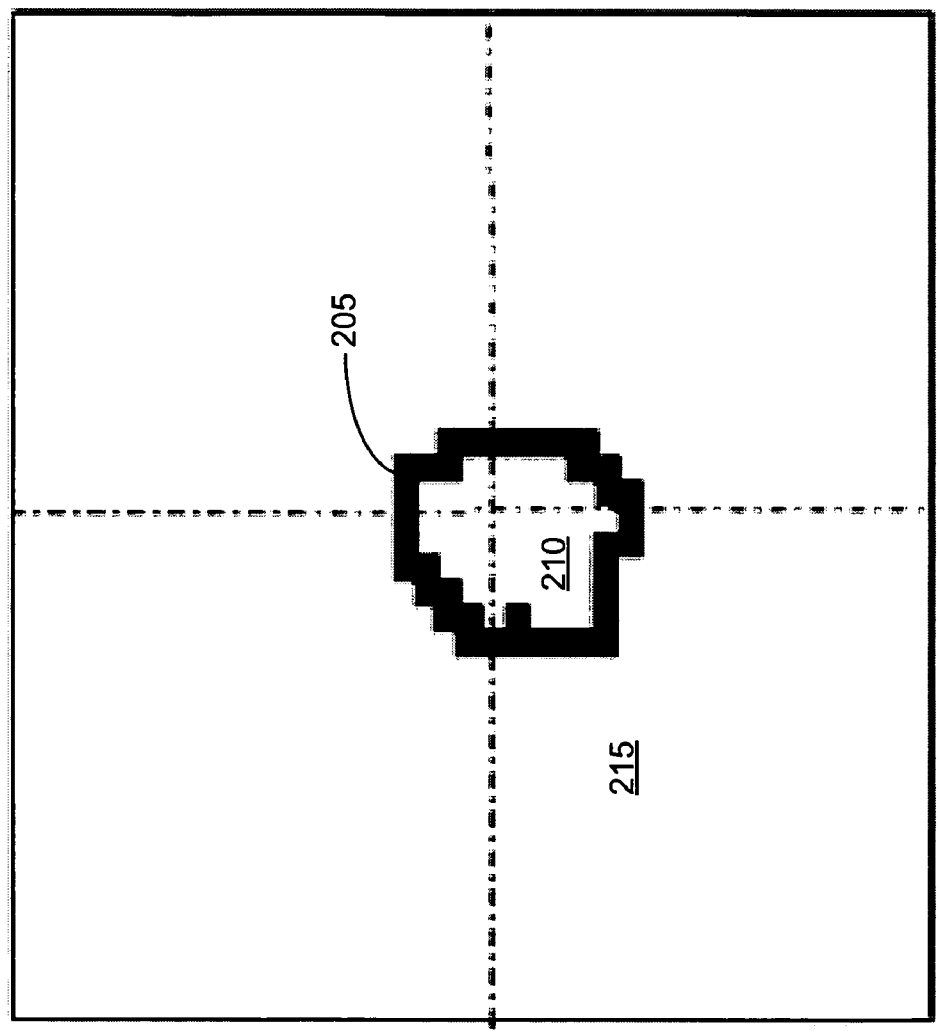
FIG. 2 depicts an image after performing watershed segmentation on the CT image of FIG. 1 after object and background local maxima suppression, in accordance with one exemplary embodiment of the present invention.

Referring now to FIG. 2, a watershed output 200 of the CT image 100 of FIG. 1 after object and background local maxima suppression, as described in greater detail above, is shown. The ridge points (i.e., the shaded border) 205 clearly separate the polyp 210 from the surrounding bodily tissue 215 and the colon wall (i.e., the edge between the polyp 210 and the surrounding bodily tissue 215). The ridge points 205 automatically identify the optimal cut between the polyp 210 and the colon wall The separation between the polyp 210 and the colon wall can then be used for further computation based on connected components. For example, consider a method for cutting planes, which may be used to detect polyps in CT scans of the colon. The cutting planes method can be applied to the present invention using an image segmentation that takes into account the segmentation into watershed clusters. An exemplary method for cutting planes can be found in co-pending and commonly-assigned patent application Ser. No. 10/945,130 filed on Sep. 20, 2004 and entitled "METHOD AND SYSTEM FOR USING CUTTING PLANES FOR COLON POLYP DETECTION, which is fully incorporated herein by reference.

FIG. 3 shows the result of segmentation of the image of FIG. 2 using a simple threshold and information from the watershed segmentation (i.e., the crest points). In an exemplary simple threshold, a pixel is set to black if the pixel's intensity is below the threshold, and set to white otherwise. This simple threshold would normally not separate the polyp from the colon wall. On the other hand, both objects (i.e., the polyp and the colon wall) can be isolated by enforcing the regions to be separated by the ridges of the watershed.

It should be appreciated that any of a variety of segmentation methods may be used, as contemplated by those skilled in the art. For example, segmentation may be accomplished using a fixed threshold, a global adaptive threshold (i.e., using statistics such as mean, minimum, maximum, standard deviation, quantiles, and weighted version thereof, iterative methods or image histogram analysis), and a local adaptive threshold (i.e., same as global adaptive threshold but applied locally to a sub-volume).

In one exemplary embodiment, watershed segmentation may be implemented in the following steps:

(1) Select a volume of interest ("VOI") inside a volumetric image. This could be the whole volume.

(2) Inside the VOI, select seed points among the local maxima within the VOI (or local minima, if one is looking for holes rather than bumps).

(3) Remove some irrelevant watershed clusters based on specific criteria, e.g. minimum surface, maximum surface, minimum circularity, number and position of neighboring clusters.

It should be appreciated that the any of a variety of watershed segmentation methods may be used, as contemplated by those skilled in the art. For example, another exemplary embodiment may not require the selection of seeds.

In addition, the present invention may be applied to images where the occurrence of the ridge may be recovered using watershed only by analyzing a temporal sequence of images and hence as a part of dynamic process. It can also be used to detect holes (depressions) in a symmetrical way, such as diverticultosis.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of detecting a desired object at a candidate pixel from an image, comprising the steps of:
   a. selecting a representative point in the desired object;
   b. determining first representative cross-sections of the desired object by passing first lower dimension planes through the representative point;
   c. passing at least one second lower dimension plane through the candidate pixel;
   d. using region segmentation to separate the candidate pixel containing second regions from the rest of the pixels in each of the at least one second lower dimension plane;
   e. matching at least one of the second regions with at least one of the first cross-sections;
   f. determining a match value based on the result of step e; and
   g. using the match value to determine if the desired object is detected at the candidate pixel.

2. The method of claim 1, further comprising the step of:
   selecting the image, wherein the image is at least two-dimensional.

3. The method of claim 2, wherein the step of obtaining the image comprises:
   selecting a medical image.

4. The method of claim 3, wherein the step of selecting a medical image comprises:
   selecting one of a computer tomography (CT) image, a magnetic resonance (MR), a positron emission tomography (PET) image, an ultrasound (US) image, and a single photon emission computed tomography (SPECT) image.

5. The method of claim 1, wherein the step of determining a first representative cross-section of the desired object by passing first lower dimension planes through the representative point comprises:
determining a first representative cross-section of the desired object by passing a two-dimensional cross-section through the representative point, wherein the image is three-dimensional.

6. The method of claim 1, wherein the step of using region segmentation comprises:
using thresholding.

7. The method of claim 6, wherein the step of using thresholding comprises:
using one of fixed thresholding, global adaptive thresholding, and local adaptive thresholding.

8. The method of claim 1, further comprising:
selecting the desired object of a desired shape.

9. The method of claim 8, wherein the step of selecting the desired object of a desired shape comprises:
selecting the desired object of one of a spherical shape and an ellipsoidal shape.

10. The method of claim 1, wherein the step of using region segmentation comprises:
using watershed segmentation.

11. The method of claim 10, wherein the step of using watershed segmentation comprises:
growing watershed clusters in a volume of interest (VOI) of the image; and
removing irrelevant watershed clusters based on a watershed criteria.

12. The method of claim 11, further comprising the step of:
selecting the VOI inside the image.

13. The method of claim 11, further comprising the step of:
selecting seed points within the VOI.

14. The method of claim 13, wherein the step of growing watershed clusters in the VOI comprises:
growing watershed clusters from the seed points.

15. The method of claim 13, wherein the step of selecting seed points within the VOI comprises:
selecting seed points among local maxima within the VOI.

16. The method of claim 13, wherein the step of selecting seed points within the VOI comprises:
selecting seed points among local minima within the VOI.

17. The method of claim 11, wherein the step of removing irrelevant watershed clusters based on watershed criteria comprises:
removing irrelevant watershed clusters based on at least one surface property.

18. The method of claim 17, wherein the step of removing irrelevant watershed clusters based on at least one surface property comprises:
removing irrelevant watershed clusters based on at least one of a maximum, a minimum, a minimum circularity, a number of neighboring clusters, a position of neighboring clusters, first order derivatives, second order derivatives and properties from the watershed clusters.

19. A machine-readable medium having instructions stored thereon for execution by a processor to perform a method of detecting a desired object at a candidate pixel from an image, the method comprising:
a. selecting a representative point in the desired object;
b. determining first representative cross-sections of the desired object by passing first lower dimension planes through the representative point;
c. passing at least one second lower dimension plane through the candidate pixel;
d. using region segmentation to separate the candidate pixel containing second regions from the rest of the pixels in each of the at least one second lower dimension plane;
e. matching at least one of the second regions with at least one of the first cross-sections;
f. determining a match value based on the result of step e; and
g. using the match value to determine if the desired object is detected at the candidate pixel.

20. A system of detecting a desired object at a candidate pixel from an image, comprising:
a selection means for selecting a representative point in the desired object;
a determination means for determining first representative cross-sections of the desired object by passing first lower dimension planes through the representative point;
a segmentation means for using region segmentation to separate the candidate pixel containing second regions from the rest of the pixels in each of the at least one second lower dimension plane;
a match means for (a) matching at least one of the second regions with at least one of the first cross-sections, and (b) determining a match value based on the matching; and
a detection means for using the match value to determine if the desired object is detected at the candidate pixel.

* * * * *